Aug. 19, 1969  C. H. MOTZ ET AL  3,461,526
AUTOMATIC GEAR BURNISHING FIXTURE
Filed June 27, 1967  2 Sheets-Sheet 1
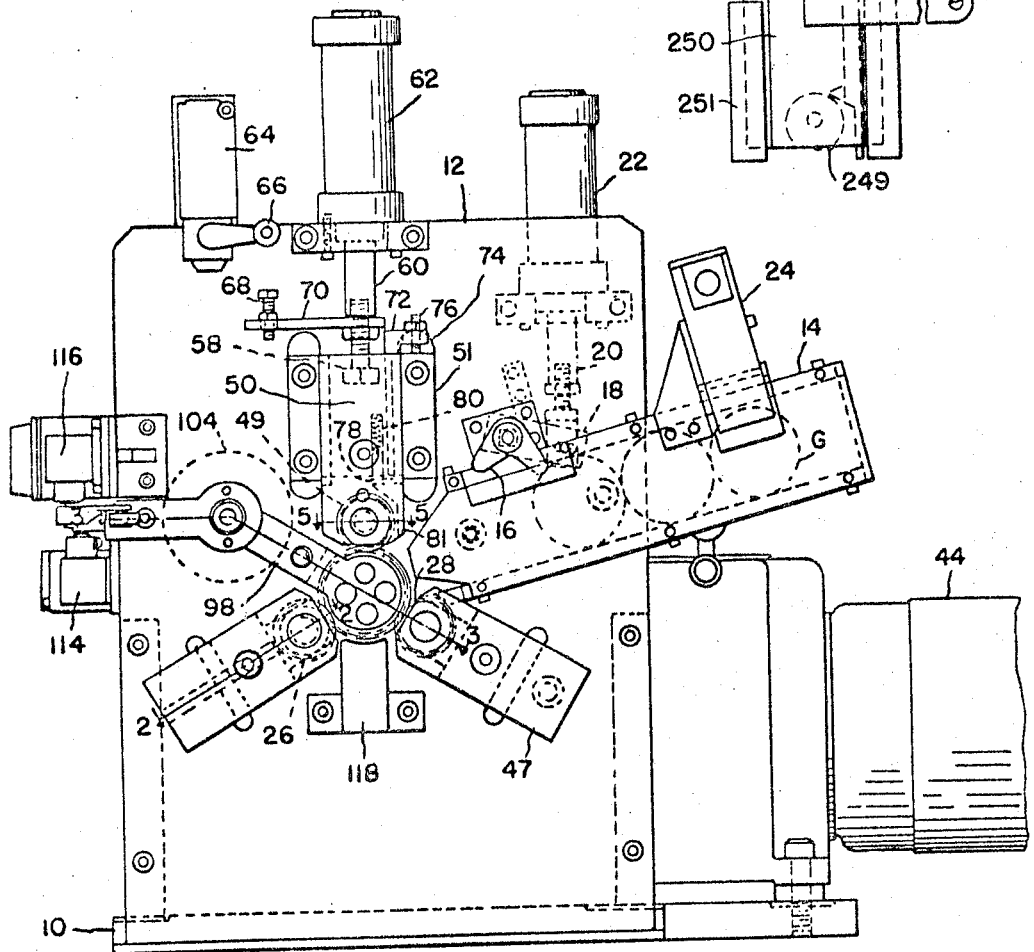
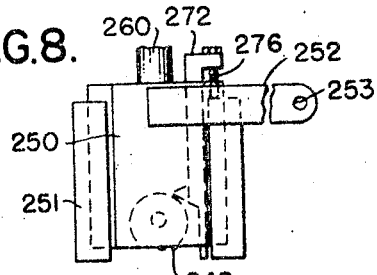
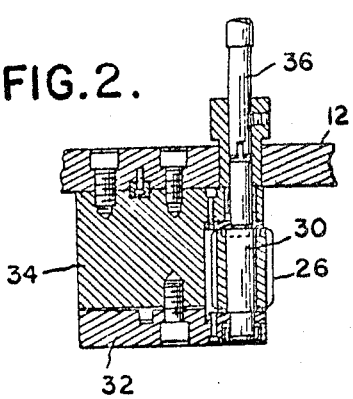
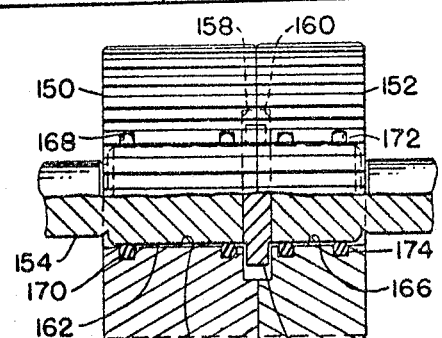
INVENTORS
CARL H. MOTZ
RUSSEL W. ANTHONY
BY Whittemore,
Hulbert & Belknap
ATTORNEYS

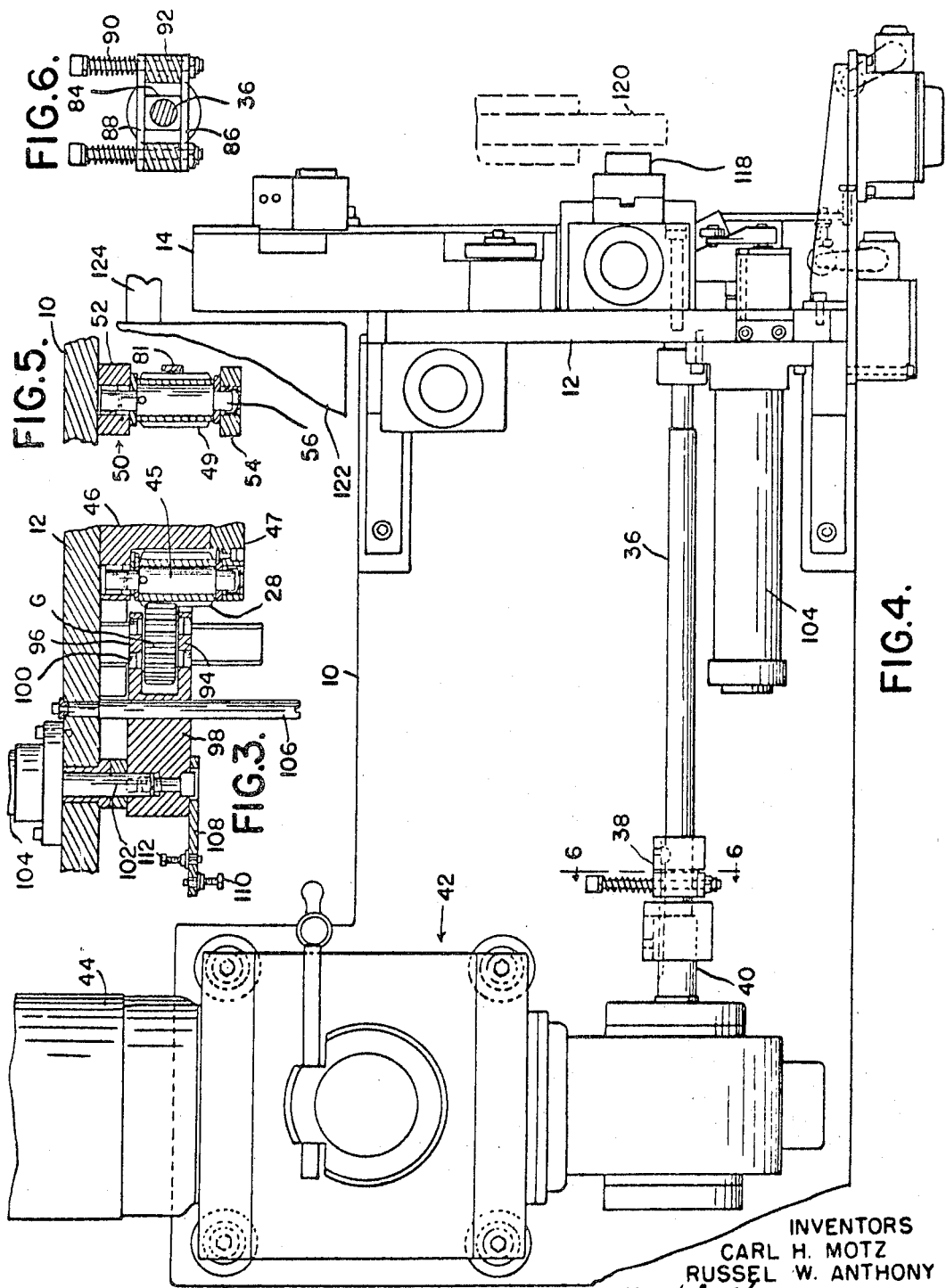

United States Patent Office 3,461,526
Patented Aug. 19, 1969

3,461,526
AUTOMATIC GEAR BURNISHING FIXTURE
Carl H. Motz, Harper Woods, and Russel W. Anthony, Detroit, Mich., assignors, by mesne assignments, to Lear Siegler, Inc., Santa Monica, Calif., a corporation of Delaware
Continuation-in-part of application Ser. No. 513,300, Dec. 13, 1965, which in turn is a continuation-in-part of application Ser. No. 335,971, Jan. 6, 1964. This application June 27, 1967, Ser. No. 649,331
Int. Cl. B24b 39/00
U.S. Cl. 29—90
16 Claims

ABSTRACT OF THE DISCLOSURE

A gear burnishing fixture comprising three burnishing gears one of which is movable toward and away from the other two to provide for advance of a work gear into the burnishing zone, the movable gear being mounted on a carrier and preferably associated with brake means effective to oppose rotation of the movable gear except when it is fully meshed with a work gear.

Cross-reference to related applications

This is a continuation-in-part of application Ser. No. 513,300, filed Dec. 13, 1965, now abandoned, which in turn is a continuation-in-part of application Ser. No. 335,971, filed Jan. 6, 1964, now abandoned.

Background of the invention

It has been found that a relatively high percentage of entirely satisfactory gears are rejected by a gear checker because of very minor protuberances formed on the flanks of the gear teeth, or in some cases carried by the tooth surfaces. In automatic gear production the final checking of gears results in acceptance or rejection of the gears for ultimate use and assembly. The rejected gears are ordinarily classified in accordance with the particular deficiency noted by the checker and if the deficiency is of a proper type, the gear may be sent back for refinishing. In general however, the refinishing operation adds materially to the cost of the finished gear and the expense of refinishing gears which do not actually need such refinishing, is desirably avoided by the use of the present invention.

Summary of the invention

In accordance with the present invention a gear checker has associated therewith a gear burnishing fixture which is adapted to receive gears and burnish them briefly just prior to passing them on to the gear checker.

It is accordingly an object of the present invention to provide a method of finishing gears which comprises burnishing the gears lightly just prior to checking.

It is a further object of the present invention to provide a gear burnishing attachment to a gear checker so that gears supplied serially and automatically to the checker are required to pass through the burnisher to receive a light burnishing action.

It is a feature of the present invention to provide a burnisher provided with three gear-like burnishing tools, two of which are mounted on stationary axes and the third one of which is movable radially of its axis in a direction substantially perpendicular to the plane joining the axes of the first and second burnishing tools.

It is a further feature of the present invention to provide a three-roll burnisher as an attachment to a gear checker in which the work gears are advanced in an input chute into engagement with the burnishing gears, the gear is there burnished, and after burnishing the gear is moved axially into engagement with the input chute of the gear checker.

It is a further feature of the present invention to provide in a three-roll burnisher, a movable burnishing gear movable radially of a work gear in mesh with two cooperating burnishing gears, a fluid cylinder connected to the movable burnishing gear and a brake engaging said movable gear so long as it remains out of mesh with a work gear meshed with the two remaining burnishing gears.

Other objects and features of the invention will become apparent as the description proceeds, especially when taken in conjunction with the accompanying drawings, illustrating preferred embodiments of the invention.

Brief description of the drawings

FIGURE 1 is a side elevational view of the burnishing attachment.

FIGURE 2 is a fragmentary sectional view on the line 2—2, FIGURE 1.

FIGURE 3 is a fragmentary sectional view on the line 3—3, FIGURE 1.

FIGURE 4 is a plan view of the burnishing attachment.

FIGURE 5 is a fragmentary sectional view on the line 5—5, FIGURE 1.

FIGURE 6 is a fragmentary sectional view on the line 6—6, FIGURE 4.

FIGURE 7 is an enlarged elevational view, partly in section, of a burnishing gear set.

FIGURE 8 is a diagrammatic view illustrating a different form of carrier for the movable burnishing gear.

Description of the preferred embodiments

Before referring in detail to the drawings the overall operation of the machine will be described. A series of work gears are advanced one at a time down an inclined input chute where each gear rolls into meshing relation with a pair of gear-like burnishing tools mounted in fixed position for rotation. One of these burnishing gears or tools is driven in rotation. A third burnishing gear is provided which is movable vertically toward and away from the work gear in mesh with the two lower burnishing gears. When a work gear has meshed with the two lower burnishing gears the upper burnishing gear is moved downwardly as rotation is imparted to the work gear.

The burnishing pressure is applied by means of a hydraulic cylinder connected to the aforesaid third burnishing gear and also associated with it is a spring pressed brake which opposes rotation of the third burnishing gear so long as it is held out of mesh with a work gear. The result of this is that as the work gear is driven in rotation by driving one of the two lowermost burnishing gears, meshing between the work gear and the uppermost or third burnishing gear occurs because the brake opposes rotation of the third burnishing gear. As soon as it drops into mesh with the work gear the brake action is relieved.

After a predetermined interval, as for example five or six seconds, during which the work gear rolls in tight mesh under pressure contact with the three equally spaced burnishing gears, the cycle is completed and pressure is relieved on the uppermost burnishing gear, at which time the burnished work gear is shifted axially into registration with an input chute leading directly to the gear checker.

Referring now to the drawings, the burnishing attachment comprises a base plate 10 having fixedly secured to one end thereof a vertically extending plate 12. A burnisher input chute 14 is provided along which a series of gears G advance, the foremost gear being retained against displacement by a forked releasing element 16 actuated by a crank connection 18 to the piston rod 20 of a fluid cylinder 22. A proximity switch 24 is provided which senses the presence or absence of a gear G adjustment the switch so as to terminate the fully automatic operation of the equipment when gears are no longer furnished to the burnisher.

The burnishing station is defined by the location of three burnishing gears which are adjusted into positions in accordance with the size of the work gear so as to mesh therewith at approximately equal intervals thereabout. The two lowermost burnishing gears designated 26 and 28 respectively, are mounted for rotation in fixed locations during a burnishing cycle. As best seen in FIGURE 2, the burnishing gear 26 is mounted on a shaft 30 journaled between the plate 12 and a plate 32 mounted on the plate 12 by a spacer 34. The burnishing gear 26 is the driving element of the combination and is connected by a drive shaft 36 through a torsion release drive member 38 to the output shaft 40 of a speed reducer indicated generally at 42 which receives the output shaft of a drive motor 44.

The mounting of the gear 28, as best seen in FIGURE 3, is similar to that of the gear 26 except that the shaft 45 on which it is mounted is freely rotatable. The shaft 45 is journaled at one end in the block 46 and at its other end in a plate 47.

The third burnishing gear 49, as best seen in FIGURES 1 and 5, is mounted in a carrier or slide assembly 50 which is vertically slidable on the plate 12 between a pair of gibs 51. As best seen in FIGURE 5, the vertical slide assembly 50 comprises a back plate 52 and a front plate 54 between which extends the shaft 56 on which the vertically movable burnishing gear 49 is keyed or otherwise secured. The slide assembly 50 is connected by a bolt 58 to the piston rod 60 of a fluid piston 62 which is adapted to control vertical movement of the upper burnishing gear 49 and also to determine the burnishing pressure applied to the gear.

A limit switch 64 is provided having an actuating roller 66 engageable by an adjustable screw 68 carried by an arm 70 clamped to the piston rod 60.

Movable vertically in an opening provided in the slide assembly 50 is a brake element 72 the upper end of which extends laterally as indicated at 74 and carries an adjustable abutment screw 76 engageable by the upper end of one of the gibs 51. At its lower end the brake element extends laterally as indicated at 78, to overlie the uppermost burnishing gear 49 and this lateral extension is engaged by a compression spring 80 urging the brake element downwardly to engage the periphery of the burnishing gear 49.

Referring now to FIGURES 1 and 5 it will be observed that the brake element 72 includes a downwardly extending finger 81 located at the right side of the burnishing gear 49 as seen in FIGURE 1, in a position to be engaged by the next succeeding work gear G and to arrest it just short of entry into the working station defined by its meshed engagement with the two lower burnishing gears 26 and 28. After a predetermined interval of burnishing the pressure applied to the cylinder 62 which determines the burnishing pressure between the work gear and the burnishing gears is released but it is not reversed at this time. In other words, the slide 50 remains in its lowermost position and the burnishing gear 49 remains in mesh with the finished work gear. At this time, as will subsequently appear, the finished work gear is shifted axially by means of a locating and ejecting device, this movement of the work gear being readily permitted since the presure contact between the burnishing rolls and the work gear has been relieved. At the same time, the next following gear is retained against interference by the presence of the stop finger 81. After the work ejecting means has operated to remove a finished work gear from meshed engagement with the burnishing rolls and has returned to receive the next work gear, pressure is admitted to the cylinder 62 in a direction to move the slide 50 upwardly, thus removing the finger 81 from the path of the next succeeding work gear. By this means it is possible to eliminate lost time since the next succeeding work gear is prevented from moving into the work zone by stop means which arrest its motion directly adjacent and just short of the operating or working zone.

In operation a work gear G is released by a back and forth oscillation of the forked element 16. At this time pressure is applied to the cylinder 62 so that the burnishing gear 49 is in an uppermost position. The work gear G rolls into mesh with the burnishing gears 26 and 28, of which the burnishing gear 26 is in continuous rotation. The work gear G is thus driven in rotation by the burnishing gear 26 and imparts rotation to the burnishing gear 28. At this time pressure is applied in the cylinder 62 to move the slide assembly 50 downwardly so that the burnishing gear 49 contacts the periphery of the work gear. If, as sometimes happens, the teeth of the work gear and the burnishing gear 49 engage at their crests, pressure applied by the spring 80 to the brake element 72 opposes rotation of the burnishing gear 49 so that continued rotation of the work gear causes the engaged tops of the teeth to disengage and permits the burnishing gear 49 to drop into mesh with the work gear at the upper portion thereof. Downward movement of the slide assembly 50 causes the screw 76 on the brake element to engage the upper end of one of the gibs 51, thus releasing the brake.

In addition to the foregoing arrangement for assuring meshing between the teeth of the work gear and the teeth of the burnishing gears, the construction illustrated in FIGURE 6 is also helpful in this connection. It will be observed that the shaft 36 is provided with a square section 84 which is gripped between a pair of plates 86 and 88 resiliently urged together by compression springs 90 and held at the proper spacing to engage opposite sides of the square section 84 by spaced arms 92. It will be apparent that if for any reason rotation of the burnishing gear 26 is opposed or prevented, the increase in torque transmitted between the arms 92 and the square section 84 of the shaft 36 will force the plates 86 and 88 apart. This in turn will apply reverse impulses to the shaft 36 as the drive shaft 40 continues to drive in one direction.

Referring again to FIGURE 3, it will be observed that in the working station the work gear G is received between spaced jaws 94 and 96 of an extractor block 98. The jaws 94 and 96 are provided with carbide inserts 100. The extractor block 98 is connected to the piston rod 102 extending from a piston received in the fluid cylinder 104. The block 98 is guided for movement by means of a rod 106 rigidly connected to the plate 12. Connected to the block 98 is an arm 108 carrying adjustable abutment screws 110 and 112 adapted to actuate limit switches 114 and 116 respectively.

Upon termination of a timed burnishing cycle the fluid pressure is released in the cylinder 62 although not reversed at this time. This relieves the burnishing pressure on the work gear G. At this time the fluid pressure is applied to the cylinder 104 in a direction to shift the extractor block 98 laterally so as to shift the completed work gear axially beyond the burnishing gears 26, 28 and 49. As the completed gear moves forwardly as best seen in FIGURE 1, it is supported by a tray 118 until it moves into registration with an input chute 120 leading to the gear checker, a portion of which is illustrated in FIGURE 4 at 122. Details of this gear checker form no part of the present invention but it is noted that it includes an expanding arbor, a portion of which is diagrammatically indicated at 124, which is adapted to move into the central opening in the burnished gear when it has rolled down the input chute 120 into registration with the arbor 124. At this time a variety of checks are performed on the finished gear including a measurement of size, eccentricity, tooth-to-tooth spacing, helix angle, and the presence of any nicks or burrs on the teeth.

By the burnishing operation which is performed immediately prior to checking, the presence of any minor protuberances such as nicks or burrs on the teeth of the gear, which would not be sufficient to justify rejection of the gear, are eliminated in the burnishing operation.

It has been found that the burnisher disclosed herein, while it is not intended to correct disqualifying gear defects, eliminates minor imperfections of a character which would not justify rejection but which might otherwise cause rejection by the sensitive gear checking equipment in use today. Moreover, exhaustive tests have shown that the combined burnishing and checking operation is effective to repeat classification of gears with no substantial variation. Test gears with known imperfections passing through the gear checker without burnishing result in rejection of a number of gears whose imperfections really do not justify rejection. After passing through the burnisher, only those gears having imperfections of a magnitude which actually justifies rejection, are rejected by the checker. Moreover, the same gears passing through the combination burnisher and checker an additional number of times results in consistent rejection of those gears whose imperfections justify rejection and consistent acceptance of the gears whose imperfections do not justify rejection.

In the apparatus as so far described, the burnishing gears are illustrated and described as fixedly mounted on their support shafts. However, in some cases, particularly where the gear being burnished has differently formed teeth adjacent opposite sides of the gear, a different construction is desirable. An example of such a gear is one in which the teeth are continuous from end to end, but the end portions of each tooth are finished in a separate operation so that the end portions of the same teeth are not identical. In this case, the burnishing gear sets are provided with a first burnishing gear 150 the teeth of which are conjugate to the end portion of a work gear, and a second burnishing gear 152 the teeth of which are conjugate to the opposite end portions of the teeth of the work gear. In the particular embodiment illustrated the burnishing gear 150 is somewhat wider than the burnishing gear 152 but this depends of course upon the design of the particular gear upon which the burnishing gears operate. The burnishing gears 150 and 152 are mounted on a shaft 154 having a drive pin 156 extending radially therethrough. The adjacent end faces of the gears 150 and 152 are provided with elongated recesses 158 and 160 respectively, which together receive the drive pin 156. It will be observed that the shaft 154 in the zone receiving the gears 150 and 152, has an enlarged cylindrical portion 162 dimensioned with respect to the cylindrical openings 164 and 166 in the gears 150 and 152 respectively to provide limited clearance. The gear 150 is provided with a pair of annular recesses 168 adjacent the edges thereof adapted to receive O-rings 170 in substantial compression. Similarly, the gear 152 is provided with annular recesses 172 adapted to receive O-rings 174 in substantial compression. With this arrangement it will be observed that the gears 150 and 152 are adapted to have limited float relative to the shaft 154 so as to accommodate themselves precisely to the engaged teeth of the work gear. It will be understood that all three sets of burnishing gears, designated generally 26, 28 and 49, may be of the construction illustrated in FIGURE 7.

While the apparatus has been illustrated as having the pair of shafts or gear supports 30 and 45 in a common horizontal plane, and the shaft or support 56 as vertically movable, it is of course obvious that this orientation is not necessary, and the shafts might for example extend vertically.

While the carrier above described is reciprocable in a straight line path, it will of course be apparent that the carrier might for example be mounted on an arm so as to swing in an arc. Such an arrangement is illustrated in FIGURE 8 where the carrier 250 has edge flanges which are slidable beneath gibs 251. Carrier 250 is movable in an arc as determined by arm 252 which is pivoted to the mounting plate as indicated at 253. Carrier 250 carries the burnishing gear 249 corresponding to the gear 49 shown in FIGURE 1, and similar brake action is provided by the brake element 272 spring urged into engagement with the burnishing gear 249 and moved out of braking engagement by an abutment screw 276 which engages the upper end of the right hand gib as seen in FIGURE 8. Generally vertical movement of the carrier 250 is accomplished by a piston 260 connected to a piston rod (not shown) movable in a cylinder (not shown). The operation is identical with that of the construction shown in FIGURE 1 except that the carrier 250 moves in an arc as determined by the radius of the arm 252 rather than in a straight line. However, its movement into and out of mesh with the work gear is for all practical purposes a movement radial with respect to the work gear.

The drawings and the foregoing specification constitute a description of the improved automatic gear burnishing fixture in such full, clear, concise and exact terms as to enable any person skilled in the art to practice the invention, the scope of which is indicated by the appended claims.

What we claim as our invention is:

1. A gear burnisher comprising a frame, a pair of rotary burnisher gear supports disposed on said frame with their axes in parallelism, means for driving one of said pair of supports in rotation, a carrier movable on said frame toward and away from the plane containing the axes of said pair of rotary supports, a third rotary burnisher gear support on said carrier disposed with its axis parallel to and intermediate said pair of supports, a feed chute disposed transversely to the axes of said supports to guide a work gear into mesh with burnishing gears on said pair of supports, and an actuating and pressure piston and cylinder device connected between said frame and said carrier to move said carrier toward said pair of supports to mesh a third burnishing gear carried by the support on said carrier with a work gear being driven in rotation by the said one of said pair of rotary supports.

2. A gear burnisher as defined in claim 1 comprising a brake carried by said carrier and engageable with the burnishing gear carried thereby, and means operable only upon meshing engagement between the last named burnisher gear and the work gear to release said brake.

3. A burnisher as defined in claim 2 in which said brake is movably carried by said carrier, resilient means connected between said carrier and said brake, and abutment means acting between said brake and said frame to release said brake on predetermined downward movement of said carrier.

4. A burnisher as defined in claim 3 in which said brake comprises a shoe movable against a side of the third burnisher gear and a finger extending at the side of said last named burnisher gear in position to block entry of a work gear into mesh with the burnisher gears on the pair of supports, means operable to release pressure on said carrier without retracting said carrier to release a finished gear for ejection and operable thereafter to retract said carrier to provide for immediate entry of the next gear into mesh with the pair of burnisher gears.

5. A gear burnisher as defined in claim 1 comprising an ejector member having a portion located at one side of the position occupied by a work gear in mesh with the burnisher gears, and means for shifting said member laterally to move a burnished work gear axially out of mesh with the three burnisher gears.

6. A gear burnisher as defined in claim 1 comprising a locator and ejector member having locating jaws in position to lie adjacent to the sides of a work gear in mesh with three burnisher gears on said supports, and means for shifting said member laterally to move a burnished work gear axially out of mesh with the three burnisher gears.

7. A burnisher as defined in claim 6 in which the jaws of said members have hard inserts in the faces thereof adjacent the work gear.

8. A burnisher as defined in claim 1 in which said pair of supports have their axes in a horizontal plane, and said third support is vertically movable.

9. A burnisher as defined in claim 1 in which the burnisher gear supports comprise shafts and the burnisher gears are mounted on the shafts with appreciable radial clearance, and resilient means interposed between the shafts and burnisher gears to provide limited float of the gear relative to the shafts.

10. A gear burnisher as defined in claim 9 in which the burnisher gears are keyed to the shafts for rotation therewith.

11. A gear burnisher as defined in claim 9 in which two burnisher gears are mounted on each shaft for independent floating movement relative thereto.

12. In a three-roll burnisher comprising a pair of laterally spaced burnisher gears occupying a horizontal plane, an inclined chute for advancing work gears serially to a working station in mesh with said pair of burnisher gears, a carrier movable vertically above said pair of burnisher gears, a third burnisher gear on said carrier, means for driving one of said pair of burnisher gears in rotation, stop means on said carrier extending into the path of the next successive work gear to stop it just short of entry into the working station, pressure means acting on said carrier to apply pressure through said third burnisher to a work gear, means operative to relieve pressure on said carrier to release a finished work gear while retaining the third burnisher gear in guiding relation and said stop means in position to prevent entry of the next gear into the working station, means for thereafter shifting a finished gear axially out of the working station, and means for then raising said carrier to raise the burnisher gear thereon and the stop means thereon into clearance to provide for advance of the next gear into the working station.

13. Structure as defined in claim 12 comprising a brake on said carrier engageable with the burnisher gear thereon, and means for releasing said brake when said third burnisher gear enters into mesh with the work gear.

14. A gear burnisher comprising a frame, a pair of rotary burnisher gear supports disposed on said frame with their axes in parallelism and substantially horizontal, a carrier movable on said frame having a third rotary burnisher gear support with its axis in parallelism with the axes of said pair of supports and movable substantially vertically toward and away from the plane containing the axes of said pair of supports, a burnishing gear on each of said supports, a feed chute disposed transversely to the axes of said supports to guide a work gear into position above and in meshing relation to burnishing gears on said pair of supports while said third support is displaced upwardly, a pressure piston and cylinder device connected between said frame and said carrier to move the burnishing gear on said third rotary support into mesh with a work gear in mesh with the burnishing gears on said pair of supports and to develop burnishing pressure between the work gear and all of said burnishing gears, and means for driving one of said burnishing gears in rotation.

15. A burnisher as defined in claim 14 comprising a discharge chute, and means for moving the work gear from working position in mesh with the three burnishing gears into the discharge chute while continuing to drive said one burnishing gear in rotation.

16. A burnisher as defined in claim 14 in which the means for driving said one burnishing gear operates continuously during loading, burnishing, and unloading a series of work gears.

References Cited

UNITED STATES PATENTS

| | | | |
|---|---|---|---|
| 1,576,806 | 3/1926 | Blood | 29—90.90 |
| 1,642,179 | 9/1927 | Schurr | 29—90.90 |
| 1,915,749 | 6/1933 | Mullen | 29—90.90 |
| 1,990,239 | 2/1935 | Miller | 29—90.90 |
| 2,352,557 | 6/1944 | Miller | 29—90.90 |

RICHARD H. EANES, Jr., Primary Examiner